United States Patent Office 3,109,868
Patented Nov. 5, 1963

---

3,109,868
COUPLING OF AROMATIC RINGS
Ellis K. Fields, Chicago, Ill., and Carl Serres, Jr., Whiting, Ind., assignors to Standard Oil Company, Chicago, Ill., a corporation of Indiana
No Drawing. Filed Oct. 30, 1961, Ser. No. 148,722
11 Claims. (Cl. 260—668)

This invention relates to the preparation of dairylmethanes and more specifically pertains to the preparation of a major proportion of a certain class of diarylmethanes obtained by the coupling of aromatic hydrocarbons by a methylene group contributed by a halomethyl naphthalene to produce said certain class of diarylmethanes and also produce as a co-product a compound corresponding to the halomethyl naphthalene reactant but having at least one less halomethyl group. Said coupling reaction is carried out in the presence of a certain class of aluminum containing catalysts.

The condensation of a benzyl halide such as benzyl chloride with an aromatic compound (i.e. benzylation) in the presence of a wide variety of catalysts under various reaction conditions has been extensively studied. The catalysts most often used are halides of aluminum, iron, titanium, beryllium, zinc and tin; the metals themselves, such as aluminum; or strong mineral acids, such as hydrogen fluoride. In general, these reactions produce as the principal product a benzylated aromatic compound; i.e., each reactant contributes a portion to the final product as illustrated in the following reaction equation:

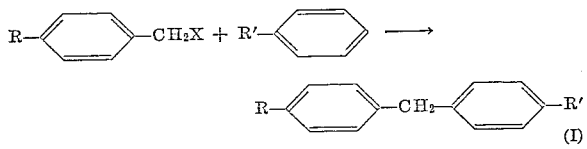

(I)

wherein R may be hydrogen, an alkyl group or a halogen; X is a halogen; and R' may be a hydrogen, an alkyl group, a halogen, a chloromethyl group, among others. Included among the by-products of such a reaction have been the diarylmethanes wherein each of the aryl groups is contributed by the aromatic reactant such as:

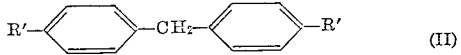

(II)

However, such diarylmethanes (II) were formed in insignificant amounts according to the above-noted processes. Also, in such processes there are formed as a substantial by-product dibenzyl benzenes of the formula:

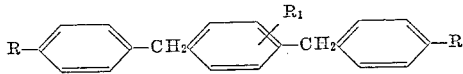

as well as higher molecular weight polybenzyl benzenes.

It will be appreciated that the benzylated aromatics of Formula I and the diarylmethanes of Formula II are, generically speaking, "diarylmethanes." However, to distinguish between those two classes of compounds the first will be referred to herein as the "expected benzyl aromatics (I)" and the second as "unexpected diarylmethanes (II)." The Roman numerals in each case will refer to the formulae hereinbefore set forth.

The principal large scale method for preparation of diarylmethanes involves condensation of two aromatic molecules with formaldehyde, using catalysts such as aluminum chloride, sulfuric acid or p-toluene sulfonic acid. Our own work with the best of these catalysts, p-toluene sulfonic acid, showed low yields obtained by the method of this invention. Further, it is difficult or impossible in many cases to condense less reactive aromatic such as benzene or chlorobenzene by the formaldehyde method, while they are readily condensed to produce diarylmethanes by the method of this invention.

The use of aluminum chloride or aluminum-heavy metal couples such as aluminum amalgam as a catalyst for the reaction of benzyl halide type reactants and aromatics have produced varied results depending upon the amount of catalyst and the ratio of reactants employed. We have observed that the use of small amounts of aluminum chloride, in the neighborhood of about 0.1 mole percent based on the benzyl halide, results in the destruction of the catalyst by the presence of minute amounts of moisture or by forming inactive complexes with the aromatic reactant. Thus, aluminum chloride was not available for any appreciable length of time as a catalyst. We have also observed that the use of gross amounts of aluminum chloride; i.e., in excess of 10 mole percent based on the benzyl halide reactant, resulted in the formation of tars, high molecular weight polybenzyl benzenes and many other by-products and did not, therefore, form the basis of a suitable process for preparing either the expected benzyl aromatics (I) or the unexpected diarylmethanes (II).

It has become desirable to have available for use in oxidation processes for the preparation of benzophenones and carboxyaryl ketones such as bis(di-carboxyphenyl) ketones and bis(monocarboxyphenyl) ketones the unexpected diarylmethanes (II). It is an object of this invention to provide a process which provides as the principal diarylmethane a major portion of the unexpected diarylmethane (II) compounds. It is also an object of this invention to provide as a principal co-product a derivative of the halomethyl naphthalene reactant which has at least one less halomethyl group than the starting reactant; i.e. naphthalene, for such a derivative can be readily obtained without resort to a hydrodemethylation process applied to methyl naphthalenes.

It has been discovered that by reacting a halomethyl naphthalene with an excess of aromatic reactant, preferably 10 to 25 moles aromatic reactant per mole of benzyl halide type reactant, in the presence of moderate amounts of anhydrous aluminum chloride or aluminum-heavy metal couple as catalyst at temperatures of 0° C. and above, the unexpected diarylmethanes (II) are produced as the major portion (above 50%) of the diarylmethane product and according to a preferred embodiment, a naphthalene is produced as the principal co-product. The advantage of producing said co-product is more readily apparent when halomethyl naphthalenes (produced by the halogenation of methyl naphthalenes or hydrocarbon mixtures containing methyl naphthalenes) are employed as the reactants with, for example, ortho or para xylene as the aromatic hydrocarbon reactant in the process of this invention. Not only are the di(o- and p-) xylyl methanes produced as the principal diarylmethane product, but there is also produced naphthalene as the principal co-product. Naphthalene can be produced from methylnaphthalenes by thermal catalytic and non-catalytic hydrodemethylation processes at relatively high pressures and temperatures; i.e. 400 to 800 p.s.i.g. and 1000 to 1400° F. However, by the process of this invention the use of such high pressures and temperatures can be avoided.

The process of this invention, as hereinbefore stated, is carried out at a temperature of 0° C. and above, desirably at a temperature in the range of 0 to 100° C. and preferably in the range of 20 to 100° C. When 10 or more moles of aromatic reactant per mole of halomethyl naphthalene reactant are employed the reaction in the presence of anhydrous aluminum chloride and/or aluminum-heavy metal couple proceeds as illustrated in the following reaction:

(2)

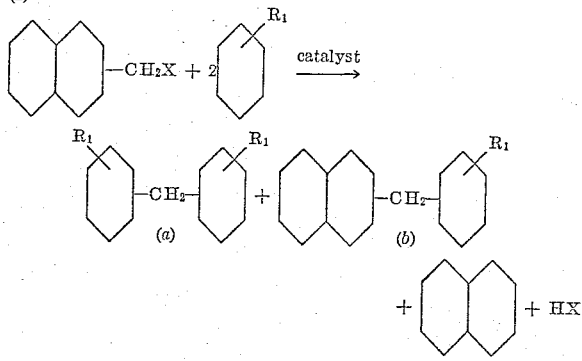

wherein $R_1$ is hydrogen, one or more alkyl groups, halogen, nitro groups and other nuclear substituted groups. With respect to (a) and (b), compound (a) will be present in amounts above 50% of the total of (a) plus (b). The halomethyl naphthalene reactant may contain 1 to 3 halomethyl groups and may also contain such additional substituents as alkyl groups, halogen and nitro groups. However the halomethyl substituted naphthalene hydrocarbons are preferred as reactants. As hereinbefore indicated, the halomethyl naphthalenes are employed mainly to provide the coupling divalent methylene group and, as reaction Equation 2 indicates, does not contribute an aryl group to the unexpected diarylmethanes (II) indicated by (a) and only a minor amount of naphthyl group to the benzyl aromatic type (I) as indicated by (b).

The halomethyl naphthalene reactant as above disclosed in regard to the reaction equation can be a halomethyl naphthalene such as the mono, di- and tri-halomethyl naphthalenes and alkyl hydrocarbon, nitro, and halogenated derivatives thereof. It will be appreciated that the process of this invention for most commercial operations will be carried out employing as the halomethyl naphthalene reactant a chloromethyl naphthalene. For example, monomethyl naphthalene, dimethyl naphthalene, trimethyl naphthalene or mixtures thereof can be chlorinated in the side chains to produce halomethyl naphthalenes which can be reacted with benzene, toluene, ethyl benzene or p-xylene to produce mainly diphenyl methane or ditolylmethane, or di(ethylphenyl) methane or dixylyl methane and naphthalene as the principal products.

When employing a halomethyl naphthalene as the reactant in the process of this invention, a single isomer need not be employed, for a mixture of halomethyl naphthalenes such as obtained by halogenating, preferably chlorinating, the methyl groups of mono-methyl naphthalene fraction or fractions obtained from the catalytic reforming of petroleum naphtha fractions will provide an advantageous source of halomethyl naphthalene reactant. Also employed to advantage is the methyl naphthalene-enriched fraction from such a catalytic reforming of petroleum naphtha fractions. Such a methyl naphthalene-enriched fraction contains mono- and di-methyl naphthalenes which can be first converted to a corresponding mixture of halomethyl naphthalenes by halogenation of the methyl groups and then may be employed without further processing to provide the halomethyl naphthalene reactant for the process of this invention.

Illustrative of the aromatic reactants are benzene, mono-, di- and tri-alkylated benzene wherein the alkyl groups contain from 1 to 20 carbon atoms, preferably 1 to 4 carbon atoms, and their nuclear halogenated derivatives, as well as their alkyl halogenated derivatives; nitro derivatives of benzene and said alkyl benzenes; biphenyl, nitro biphenyls, chloro biphenyls, alkyl ($C_1$ to $C_{20}$, preferably $C_1$ to $C_4$) biphenyls, the corresponding halo alkyl biphenyls; naphthalene, alkyl naphthalenes, nitro naphthalenes, halo alklynaphthalenes, halo naphthalenes and the like.

The aluminum-heavy metal couple catalyst is employed in an amount of at least about 0.1% by weight, desirably in the range of 0.1 to 10% by weight and preferably 1 to 5% by weight based on the halomethyl naphthalene reactant. The heavy metal component of the aluminum-heavy metal couple catalyst should, of course, be below aluminum in the electromotive series and preferably be below hydrogen. Suitable heavy metals are copper, mercury(ous), silver, palladium, mercury(ic), platinum, gold, iridium and the like. Aluminum chloride catalyst can be used in widely varying amounts. Suitably aluminum chloride is employed in the range of 2 to 40 weight percent based on the benzyl halide type reactant.

A reaction of 24.6 moles benzene and 3.96 moles benzylchloride in the presence of 2% aluminum amalgam based on benzylchloride is described as producing a 49.5 to 52.5 mole percent yield diphenylmethane in "Organic Synthesis," Collective Volume II, John Wiley & Sons (1943) reported at page 232. It will be appreciated by those skilled in the art that diphenylmethane would result regardless of the type of reaction involved; i.e., whether the reaction consists in the benzylation of benzene or in the coupling of 2 moles of benzene by the methylene group contributed by benzyl chloride. Hence the above reference does not establish the mechanism of the process of this invention.

The reaction of benzyl halide type reactant with an aromatic hydrocarbon in the presence of aluminum chloride has been previously directed to the production of the expected benzyl aromatics (I) and, accordingly, the benzyl halide reactant was employed in equimolar proportions with the aromatic, in excess of equal moles i.e. more than one mole of benzylchloride type reactant per mole of aromatic. Occasionally the aromatic reactant was employed in molar excess, up to 5 to 6 moles per mole of benzyl halide type reactant with aluminum chloride or even aluminum amalgam. However, the unexpected diaryl methane was at best produced in only minor yields and the expected benzyl aromatic was the major product. The process of this invention employing 10 or more moles of aromatic reactant per mole of halomethyl naphthalene reactant results in improved yields of the unexpected diarylmethane and the derivative of the halomethyl naphthalene reactant corresponding to the removal therefrom of at least one halomethyl group, especially naphthalene.

H. C. Brown and M. Grayson report in J.A.C.S. 75, 6285 (1953) the reaction between 400 grams (5.1 moles) benzene and 156 grams (0.8 mole) 3,4-dichlorobenzyl chloride in the presence of 2.0 grams aluminum amalgam produced a 64% yield, 3,4-dichlorodiphenylmethane, 12 grams o-dichlorobenzene and an equivalent yield of diphenylmethane, the unexpected diarylmethane (II). The process of this invention produces a substantial improvement in yield of both the unexpected diarylmethane and the derivative of the halomethyl naphthalene reactant corresponding to the removal therefrom of at least one halomethyl group as will be hereinafter demonstrated.

Previous to our discovery it was considered that the reaction of a benzyl halide type reactant with an aromatic hydrocarbon in the presence of aluminum amalgam produced a diarylmethane by the benzylation of the aromatic hydrocarbon; i.e., the reaction produced the expected benzyl aromatics (I). In support of this concept, reference is made to J. Am. Chem. Soc., 73, 1149 (1951). In this article by R. Adams and K. R. Eilar there is described the reaction of alpha-chloro meta-xylene with meta-xylene in the presence of aluminum amalgam. It is reported that this reaction produces 2,3',4-trimethyl diphenylmethane. A derivative of this compound, when compared to the same derivative of the trimethyl diphenylmethane produced by an altogether different route, establishes that the production of the aluminum amalgam catalyzed process did produce the above-named trimethyl diphenylmethane, which is, of course, the expected benzyl aromatics (I). Moreover, it is also reported that m-(dichloromethyl) benzene reacts with toluene in the presence of aluminum chloride to produce as the main product ditolylmethane rather than the expected di-m-(methylbenzyl) benzene.

However, when the process of this invention is carried out with aromatic reactants having 2 or more nuclear substituents and wherein 2 of the nuclear substituents are not so oriented as to be attached ring carbon atoms in the meta position; i.e., when the reactants contain ortho and para-oriented nuclear substituents or the halomethyl naphthalene reactant does not contain two meta-oriented halomethyl groups, the resulting diarylmethane products containing a major portion of the unexpected diarylmethanes (II).

The process of this invention and the unexpected results produced thereby will be hereinafter illustrated by the description of specific embodiments thereof.

The process to which this invention is directed, therefore, is mainly the coupling of aromatic nuclei by a methylene group provided by a halomethyl naphthalene reactant. This process comprises reacting an aromatic compound having at least one hydrogen on a ring carbon atom and a halomethyl naphthalene reactant in the presence of anhydrous aluminum chloride or an aluminum-heavy metal couple at a temperature above 0° C. The aromatic compound can be benzene or nuclear substituted benzenes,

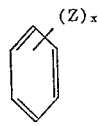

wherein Z is a nuclear substituent such as an alkyl group, hydrogen, a halogen or a nitro group and $x$ is a number of from 0 to 5. When $x$ is 0, the aromatic reactant is, of course, benzene. When $x$ is 2 or higher, the nuclear substituents Z are not in a meta-oriented configuration. In addition, aromatic reactants containing two or more fused benzene rings such as in naphthalene, anthracene, and the like or two or more benzene rings joined as in biphenyl, terphenyl, and the like as well as the alkylated, halogenated and nitro derivatives of these aromatic compounds are included in the process of this invention. More specifically, as aromatic hydrocarbons there can be employed benzene, toluene, cumene, tertiary-butylbenzene, decylbenzene, dodecylbenzene, alpha- and beta-methylnaphthalene, biphenyl, terphenyl, o- and p-xylene, o- and p-diethylbenzene, o- and p-cymene, o- and p-ethyltoluene, o- and p-diisopropyl benzene, o- and p-tertiary-butyltoluene, o- and p-tertiary-butylcumene, o- and p-ditertiary-butylbenzene, 1,2,3-trialkylbenzenes such as hemimellitine, 1,2,3-tri-ethylbenzene, and the like, 1,2,3,4-tetra-alkylbenzene such as prehnitene, pentamethylbenzene and the like. Also included are the halogenated derivatives, such as chlorobenzene, o- and p-chlorotoluene, alpha and beta chloronaphthalene, 2-chloro-meta-xylene, 2-chloro-meta-cymene, 1-chloro-2-methyl naphthalene, chlorinated biphenyl, chlorinated terphenyls and the corresponding bromo, iodo and fluoro compounds; the nitro derivatives, such as nitrobenzene, o- and p-dinitrobenzene, o- and p-nitrotoluene, 2-nitro-meta-xylene, 2-nitro-m-diisopropylbenzene, 2-nitro-meta-cymene, alpha and beta-nitronaphthalene, nitrobiphenyl and the like.

As the methylene group contributing halomethyl naphthalene reactant there can be employed compounds of the general formula:

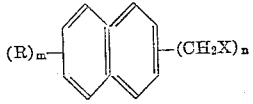

where $n$ is a number from 1 to 3 inclusive, R is halogen, nitro or an alkyl group, $m$ is a number of from 0 to 5.

The process of this example is more specifically described by the following illustrative examples. The aluminum amalgam catalyst employed in the following examples is prepared by washing finely-divided aluminum, 8–20 mesh, with ether. The washed aluminum is treated for about 2 to 3 minutes with a saturated aqueous solution of mercuric chloride. The amalgam thus formed is then rapidly washed in succession with distilled water, methanol and the hydrocarbon to be used in the reaction. All this is accomplished with a minimum exposure to the atmosphere.

*Example I*

To 320 ml. (3.12 moles) toluene containing 2.0 grams freshly prepared aluminum amalgam there is added dropwise 22 grams (0.125 mole) 1-(chloromethyl)-naphthalene over a 30-minute period. The reaction temperature was maintained between 70 and 80° C. After addition of the chloromethyl naphthalene, the resulting mixture is heated to 100° C. to complete the reaction. The reaction mixture is cooled and decanted from the catalyst. The decanted liquid is washed with water, dried over sodium sulfate and the excess toluene is removed by distillation and the residue is separated into its components. There is produced 56 mole percent yield of ditolylmethanes, 53 mole percent yield of naphthalene and 38 mole percent yield of methylbenzyl naphthalene.

*Example II*

To 330 ml. toluene containing 6.5 g. (0.05 mole) anhydrous aluminum chloride heated to 100° C. there is slowly added dropwise over 30 minutes 22 grams 1-(chloromethyl)-naphthalene. The reaction mixture is held for one hour at 100° C. after the reactants are combined. The reaction mixture is cooled, washed with water, separating the organic phase from the aqueous phase and drying the organic phase over anhydrous sodium sulfate. Excess toluene is stripped off and the residue is separated. There is produced 63 mole percent yield ditolylmethanes, 62 mole percent naphthalene and about 28 mole percent methylbenzyl naphthalene.

*Example III*

When para-xylene and freshly prepared aluminum amalgam are placed in a 1 l. flask, and chloromethyl naphthalene in an amount of about ½₀ mole per mole of the hydrocarbon is slowly added at a temperature of 50–60° C. so that evolution of hydrogen chloride is controlled and the reaction mixture, after decantation from the catalyst and a small amount of tarry sludge which has formed, is washed with dilute sodium hydroxide solution and water, dried; there may be recovered as the principal diarylmethane product di-p-xylylmethane. The co-product is, of course, naphthalene. A minor amount of naphthyl xylyl methane may also be produced.

In contrast to the foregoing, when 117 grams (1.2 moles) of benzene are reacted with 80.5 grams (0.5 moles) of o-chlorobenzyl chloride (mole ratio 2.4 to 1) in the presence of 1.0 gram aluminum amalgam at 50–60° C. for 1.5 hours, there is produced:

| | Mole | Yield, Mole percent |
|---|---|---|
| Chlorobenzene (co-product) | 0.13 | 26 |
| Diphenylmethane (unexpected diarylmethane) | 0.18 | 36 |
| Chlorodiphenylmethane (expected benzylaromatic) | 0.13 | 26 |

The yield of co-product, unexpected diarylmethane and expected benzyl aromatic are exceptionally low.

By reacting anhydrous benzene and chloromethyl naphthalene using 10 or more moles of benzene per mole of chloromethylnaphthalene in the process of this invention there may be recovered diphenylmethane and napthalene as the principal product and co-product.

By repeating the process of Examples I and II, a mixture of ortho- and para-ditolylmethanes as the main diarylmethanes may be prepared by reacting toluene with chloromethyl naphthalene, bromomethyl naphthalene, or mixtures of mono- and di-chloromethyl naphthalenes, and the like in the presence of aluminum amalgam, preferably at a temperature of 50° C. or above. The corresponding iodides and fluorides of methyl naphthalene, although more expensive than the chlorides and bromides, may also be used to provide the linking methylene groups.

The processes of Examples I and II are repeated, except that an aluminum-copper couple is substituted for aluminum amalgam. Comparable yields of the unexpected ditolylmethanes and naphthalenes may be obtained. The aluminum-copper couple is prepared by crimping together three-inch lengths of clean number 20 copper and aluminum wires.

The aluminum couple catalyst used in the process of this invention forms a black syrup complex with the aromatic reactants. However, after the reaction is complete, the aluminum-metal couple can be readily recovered substantially unchanged with no apparent loss. Much unlike the use of aluminum chloride which is usually destroyed when removing it from the reaction mixture, the aluminum-metal couple can be readily recovered and reused as, for example, by recycling with fresh reactants. It is believed that the aluminum-heavy metal couple operates so efficiently because it produces $AlCl_3$ at a built-in controlled rate. The small amounts of $AlCl_3$ produced may be destroyed as through the formation of a complex but additional fresh $AlCl_3$ is provided by the aluminum-heavy metal couple. However, attempts to determine quantitatively loss of aluminum-amalgam were unsuccessful.

While the reaction of meta-xylene with meta-methylbenzyl chloride in the presence of aluminum amalgam is reported by R. Adams and K. R. Eilar, J. Am. Chem. Soc. 73, 1149 (1951) to produce 2,3',4-trimethyl diphenylmethane (the expected benzyl aromatics I), the process of this invention produces mainly the unexpected diarylmethanes (II) when ortho- or para-oriented disubstituted benzenes are the coupled reactants. It appears, therefore, that the process of this invention is unique.

An additional advantage of the process of this invention lies in the fact that a major portion of halomethyl naphthalene reactant after contributing its methylene group or groups to the reaction is readily recoverable as naphthalene, a useful by-product. For example, when chloro-, bromo-, iodo- or fluoro-methyl naphthalene is the methylene group contributing reactant, the by-product is, of course, naphthalene. Thus, methyl naphthalene can be readily chlorinated to chloromethyl naphthalene and used to prepare di-p-xylylmethane, or ditolylmethanes, etc., according to the process of this invention and a rather pure naphthalene recovered as a by-product. Naphthalene may also be recovered when di-(chloromethyl) naphthalenes or mixtures thereof with monochloromethyl naphthalenes are employed as the methylene group contributing reactants.

The versatility or flexibility of the process of this invention and its advantages as herein described and illustrated will suggest further application of this process to those skilled in the art.

What is claimed is:

1. A process for the preparation of a diarylmethane by reacting an aromatic compound with a halomethyl naphthalene reactant wherein the aryl groups of the principal diarylmethane product are the same and are derived from the aromatic reactant by the removal of one hydrogen therefrom which comprises: reacting under anhydrous conditions at a temperature above 0° C. in the presence of an aluminum containing catalyst selected from the class consisting of anhydrous aluminum chloride and an aluminum-heavy metal couple wherein the heavy metal component is a metal below hydrogen in the electromotive series, at least 10 moles of an aromatic compound having at least one hydrogen attached to an aromatic ring carbon and is selected from the aromatic compound class consisting of aromatic hydrocarbons and nuclear substituted derivatives thereof free from meta-oriented nuclear substituents, for each mole of a halomethyl naphthalene reactant containing one to three halomethyl groups, and recovering as a principal diarylmethane product one whose aryl groups are the same and are derived from the aromatic compound reactant.

2. The process of claim 1 wherein the catalyst is aluminum amalgam.

3. The process of claim 1 wherein the catalyst is aluminum-copper couple.

4. The process of claim 1 wherein the temperature is at least about 50° C.

5. The process of claim 1 wherein the catalyst is aluminum chloride.

6. The process of claim 1 wherein monohalomethyl naphthalene is reacted with the aromatic compound and naphthalene is also recovered as a co-product.

7. A process for the preparation of diphenylmethane which comprises reacting anhydrous benzene and an anhydrous halomethyl naphthalene in the ratio of at least 10 moles of benzene for each mole equivalent of halomethyl group at a temperature of at least about 50° C. in the presence of 2 to 4 percent of aluminum amalgam by weight based on said benzyl halide reactant, and recovering diphenylmethane and naphthalene.

8. A process for the preparation of a di(mononuclear substituted phenyl) methane which comprises reacting at least 10 moles of an anhydrous mononuclear substituted benzene with each mole of halomethyl naphthalene at a temperature of at least 50° C. in the presence of from 2 to 4% aluminum amalgam, and recovering the di(mononuclear substituted phenyl) methane and naphthalene.

9. The process of claim 8 wherein naphthalene and a ditolylmethane is prepared from toluene and chloromethyl naphthalene.

10. The process for the preparation of di-p-xylylmethane which comprises reacting at least 10 moles of anhydrous p-xylene with each mole of anhydrous chloromethyl naphthalene at a temperature of at least 50° C. in the presence of 2 to 4% aluminum amalgam by weight based on chloromethyl naphthalene, and recovering di-p-xylylmethane.

11. A process which comprises reacting in the ratio of at least 10 moles of an aromatic compound with 1.0 mole of chloromethyl naphthalene at a temperature of at least 50° C. in the presence of a catalyst selected from the class consisting of anhydrous aluminum chloride and an aluminum-heavy metal couple wherein the heavy metal component is below hydrogen in the electromotive series and recovering benzene and a diarylmethane.

References Cited in the file of this patent

Chemical Abstracts, vol. 34, p. 2705 (1934).
Adams et al.: J.A.C.S., vol. 73, p. 1149 (1951).
Brown et al.: J.A.C.S., vol. 75, p. 6285 (1953).